(12) United States Patent
Binder et al.

(10) Patent No.: US 8,445,622 B2
(45) Date of Patent: May 21, 2013

(54) PROCESS FOR PREPARING POLYISOCYANATES

(75) Inventors: Horst Binder, Lampertheim (DE); Hubert Graf, St. Martin (DE)

(73) Assignee: BASF SE, Ludwigshafen (DE)

( * ) Notice: Subject to any disclaimer, the term of this patent is extended or adjusted under 35 U.S.C. 154(b) by 511 days.

(21) Appl. No.: 12/515,768

(22) PCT Filed: Nov. 30, 2007

(86) PCT No.: PCT/EP2007/063069
§ 371 (c)(1),
(2), (4) Date: Jul. 13, 2010

(87) PCT Pub. No.: WO2008/068198
PCT Pub. Date: Jun. 12, 2008

(65) Prior Publication Data
US 2010/0292396 A1      Nov. 18, 2010

(30) Foreign Application Priority Data
Dec. 4, 2006    (EP) .................................... 06125323

(51) Int. Cl.
*C08G 18/08* (2006.01)

(52) U.S. Cl.
USPC .............. 528/49; 528/48; 528/59; 548/335.1; 548/951; 548/952; 540/200; 540/201; 540/202; 544/193; 544/222; 564/44; 564/45; 560/25; 560/26; 560/115; 560/158; 560/330; 560/335

(58) Field of Classification Search
USPC .............. 548/335.1, 951, 952, 200, 201, 202, 548/222; 564/45, 44; 560/25, 26, 115, 158, 560/330, 335; 544/193, 222; 528/48, 49, 528/59; 540/200, 201, 202
See application file for complete search history.

(56) References Cited

U.S. PATENT DOCUMENTS

| 3,817,939 | A | 6/1974 | Allen et al. |
| 3,919,218 | A | 11/1975 | Schmitt et al. |
| 3,995,997 | A | 12/1976 | Boehmke et al. |
| 4,040,992 | A | 8/1977 | Bechara et al. |
| 4,324,879 | A | 4/1982 | Bock et al. |
| 4,335,219 | A | 6/1982 | Clarke et al. |
| 4,379,905 | A | 4/1983 | Stemmler et al. |
| 4,412,073 | A | 10/1983 | Robin |
| 4,454,317 | A | 6/1984 | Disteldorf et al. |
| 4,487,928 | A | 12/1984 | Richter et al. |
| 4,499,253 | A | 2/1985 | Kerimis et al. |
| 4,537,961 | A * | 8/1985 | Robin ........................ 544/193 |
| 4,596,678 | A | 6/1986 | Merger et al. |
| 4,596,679 | A | 6/1986 | Hellbach et al. |
| 4,801,663 | A | 1/1989 | Ueyanagi et al. |
| 4,820,830 | A | 4/1989 | Blank |
| 4,960,848 | A | 10/1990 | Scholl et al. |
| 5,087,739 | A | 2/1992 | Bohmholdt et al. |
| 6,093,817 | A * | 7/2000 | Kohlstruk et al. ............ 544/193 |
| 6,552,154 | B1 * | 4/2003 | Kohlstruk et al. ............ 528/52 |
| 7,022,874 | B2 | 4/2006 | Bruchmann et al. |
| 2002/0028930 | A1 | 3/2002 | Laas et al. |
| 2004/0087715 | A1 * | 5/2004 | Ohrbom et al. ............ 524/606 |
| 2010/0022707 | A1 | 1/2010 | Schaefer et al. |

FOREIGN PATENT DOCUMENTS

| DE | 26 31 733 | 2/1977 |
| DE | 28 06 731 | 8/1979 |
| DE | 29 01 479 | 7/1980 |
| DE | 32 19 608 | 9/1983 |
| DE | 38 06 276 | 9/1989 |
| DE | 100 13 186 | 9/2001 |
| DE | 100 13 187 | 10/2001 |
| DE | 10 2004 012 571 | 9/2005 |
| EP | 0 010 589 | 5/1980 |
| EP | 0 126 299 | 11/1984 |
| EP | 0 126 300 | 11/1984 |
| EP | 0 355 443 | 2/1990 |
| EP | 0 355 479 | 2/1990 |
| EP | 0 668 271 | 8/1995 |
| EP | 1 174 428 | 1/2002 |
| GB | 1 386 399 | 3/1975 |
| GB | 1 391 066 | 4/1975 |
| JP | 2 110123 | 4/1990 |
| WO | 96 25444 | 8/1996 |
| WO | 2005 113626 | 12/2005 |

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The present invention relates to a process for preparing polyisocyanates by oligomerization of isocyanates.

9 Claims, No Drawings

PROCESS FOR PREPARING POLYISOCYANATES

The present invention relates to a process for preparing polyisocyanates by oligomerization of isocyanates.

The preparation of polyisocyanates by catalytic oligomerization of isocyanates has been known for a long time. Many catalysts have been developed for these reactions. Tetra-substituted ammonium or phosphonium compounds having hydroxides, carboxylates or carbonates as counterions or silicon compounds are frequently used as trimerization catalysts.

In the catalytic oligomerization of isocyanates, the reaction has to be stopped after a particular NCO content has been reached in order to avoid an uncontrolled increase in the molar mass and thus an increase in viscosity. For this purpose, the catalyst used is deactivated in an appropriate way, for example by thermal deactivation ("thermal stopping"), distilling off the catalyst, extraction with suitable solvents, binding to absorbents or by addition of catalyst poisons which reduce the activity of the catalyst.

EP 809663 A (U.S. Pat. No. 7,022,874) describes the use of urea and ureas for the stabilization of polyisocyanate comprising biuret groups.

However, this is a stabilization and not termination of an oligomerization reaction.

Thus, DE 2806731 describes the termination of trimerization reactions by addition of acid chlorides, for example benzoyl chloride.

U.S. Pat. No. 4,960,848 uses organic acids such as sulfonic acids or phosphoric esters for stopping the reaction.

Although these compounds do generally deactivate the oligomerization very effectively, the reaction components do not also have desirable properties such as increasing the chloride content or phosphorus content. In addition, the reaction products or metabolites of the catalysts remaining in the reaction mixture may lead to undesirable reactions which frequently impair the stability during storage, for example by increases in the viscosity, color number, monomer content, etc.

In the case of thermal stopping too, which naturally occurs at temperatures higher than the trimerization temperature, it is found that the increase in temperature generally results in a significant deterioration in the product quality, in particular the color values or viscosity of the end product.

JP 2-110123 A discloses the use of compounds having sulfinamide or carboxamide groups as catalyst poisons for stopping the cyclotrimerization reaction of aliphatic or alicyclic isocyanates. As examples of carboxamide groups, mention is made of, inter alia, carbamate and urea groups.

Specific mention is made of urea and urea derivatives such as methylurea and dimethylurea, thiourea and thiourea derivatives such as methylthiourea and dimethylthiourea, and carbamates such as phenyl carbamate, ethyl carbamate and butyl carbamate.

It was an object of the present invention to develop a further process for stopping an oligomerization reaction of isocyanates, which gives storage-stable products which display a relatively low increase in viscosity and/or color number after they have been produced.

The object was achieved by a process for preparing polyisocyanates (P) by catalytic oligomerization of isocyanates (D), which comprises the steps a) reaction of at least one isocyanate (D) under suitable reaction conditions in the presence of at least one compound (K) which catalyzes the conversion of the isocyanate into the desired polyisocyanate and, if appropriate, in the presence of at least one alcohol (A) and, if appropriate, at least one solvent (L), b) addition of at least one compound (S) which is able to deactivate the catalyst (K) used in step a) to the reaction mixture when the desired conversion has been reached in step a), and c) separation of the unreacted isocyanate (D) from the resulting reaction mixture, wherein the compound (S) has the formula

 (S)

where
$R^1$ and $R^2$ are each, independently of one another, hydrogen or $C_1$-$C_{20}$-alkyl, $C_6$-$C_{12}$-aryl or $C_5$-$C_{12}$-cycloalkyl which may optionally be substituted by aryl, alkyl, aryloxy, alkyloxy, heteroatoms and/or heterocycles,
where $R^1 \neq H$ when $X=O$ or $S$,
and
$R^1$ and $R^2$ may together with the group X—(CO)—NH also form a 5- to 12-membered ring in which $R^1$ and $R^2$ together form an optionally substituted divalent $C_2$-$C_9$-alkylene radical which can also be part of an arylene or cycloalkylene radical,
Z is oxygen (O) or sulfur (S), preferably oxygen,
X is oxygen (O), sulfur (S), imino (NH) or substituted imino ($NR^3$) and
$R^3$ is $C_1$-$C_4$-alkyl,
where in the case of the compounds (S) the radical $R^1$ has at least one group which is reactive toward isocyanate.

Products which have a relatively low viscosity and/or color number and/or storage-stable products which display a relatively low increase in viscosity and/or color number after production can be obtained by means of the process of the invention.

The isocyanates (D) used can be aromatic, aliphatic or cycloaliphatic, preferably aliphatic or cycloaliphatic which will in this text be referred to as (cyclo)aliphatic for short, with particular preference being given to aliphatic isocyanates.

Aromatic isocyanates are ones which comprise at least one aromatic ring system.

Cycloaliphatic isocyanates are ones which comprise at least one cycloaliphatic ring system.

Aliphatic isocyanates are ones which comprise exclusively straight or branched chains, i.e. acyclic compounds.

The isocyanates (D) are preferably diisocyanates which bear precisely two isocyanate groups. However, they can in principle also be monoisocyanates having one isocyanate group.

It is in principle also possible to use higher isocyanates having an average of more than 2 isocyanate groups. Suitable compounds of this type are, for example, triisocyanates such as triisocyanatononane, 2,4,6-triisocyanatotoluene, triphenylmethane triisocyanate or 2,4-diisocyanatophenyl 4'-isocyanatophenyl ether or the mixtures of diisocyanates, triisocyanates and higher polyisocyanates which are obtained, for example, by phosgenation of appropriate aniline/formaldehyde condensates and polyphenyl polyisocyanates having methylene bridges.

The use of oligomeric isocyanates having free isocyanate groups, for example isocyanurates, uretdiones, biurets, urethanes, allophanates, oxadiazinetriones, iminooxadiazinetriones, uretonimines, carbodiimides, hyperbranched polyisocyanates, polyurethane-polyisocyanate prepolymers or polyurea-polyisocyanate prepolymers (see below), is also conceivable.

The diisocyanates are preferably isocyanates having from 4 to 20 carbon atoms. Examples of customary diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane and also 3 (or 4), 8 (or 9)-bis(isocyanatomethyl)tricyclo[$5.2.1.0^{2.6}$]decane isomer mixtures, and also aromatic diisocyanates such as tolylene 2,4- or 2,6-diisocyanate and isomer mixtures thereof, m- or p-xylylene diisocyanate, 2,4'- or 4,4'-diisocyanato-diphenylmethane and isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate and 4,4'- or 2,4'-di(isocyanatocyclohexyl)methane, very particularly preferably isophorone diisocyanate and hexamethylene diisocyanate, in particular hexamethylene diisocyanate.

It is also possible for mixtures of the isocyanates mentioned to be present. In addition, it can be possible firstly to react an isocyanate with the compound (S) and then react the resulting reaction product with other isocyanates. A preferred mixture is composed of hexamethylene 1,6-diisocyanate and isophorone diisocyanate.

Isophorone diisocyanate is usually present as a mixture of the cis and trans isomers, generally in a ratio of from about 60:40 to 80:20 (w/w), preferably in a ratio of from about 70:30 to 75:25 and particularly preferably in a ratio of about 75:25.

Dicyclohexylmethane 4,4'-diisocyanate can likewise be present as a mixture of the various cis and trans isomers.

For the purposes of the present invention, it is possible to use both those diisocyanates which are obtained by phosgenation of the corresponding amines and also those which are prepared without the use of phosgene, i.e. by phosgene-free processes. According to EP-A-0 126 299 (U.S. Pat. No. 4,596,678), EP-A-126 300 (U.S. Pat. No. 4,596,679) and EP-A-355 443 (U.S. Pat. No. 5,087,739), (cyclo)aliphatic diisocyanates, e.g. hexamethylene 1,6-diisocyanate (HDI), isomeric aliphatic diisocyanates having 6 carbon atoms in the alkylene radical, 4,4'- or 2,4'-di(isocyanatocyclohexyl)methane and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to form (cyclo)aliphatic biscarbamic esters and dissociating these thermally into the corresponding diisocyanates and alcohols. The synthesis is usually carried out continuously in a circulatory process and, if appropriate, in the presence of N-unsubstituted carbamic esters, dialkyl carbonates and other by-products recirculated from the reaction process. Diisocyanates obtained in this way generally have a very low or even unmeasurable proportion of chlorinated compounds, which leads to good color numbers of the products.

In an embodiment of the present invention, the diisocyanates (D) have a total content of hydrolyzable chlorine of less than 200 ppm, preferably less than 120 ppm, particularly preferably less than 80 ppm, very particularly preferably less than 50 ppm, in particular less than 15 ppm and especially less than 10 ppm. This can, for example, be measured by the ASTM method D4663-98. However, it is of course also possible to use diisocyanates (D) having a higher chlorine content, for example, up to 500 ppm.

Of course, it is also possible to use mixtures of diisocyanates which have been obtained by reaction of (cyclo)aliphatic diamines with, for example, urea and alcohols and dissociation of the resulting (cyclo)aliphatic biscarbamic esters with diisocyanates which have been obtained by phosgenation of the corresponding amines.

The polyisocyanates (P) which can be formed by oligomerization of the isocyanates (D) are generally characterized as follows:

The NCO functionality of such compounds is generally at least 1.8 and can be up to 8, preferably from 1.8 to 5 and particularly preferably from 2 to 4.

The content of isocyanate groups after the oligomerization, calculated as NCO=42 g/mol, is generally from 5 to 25% by weight.

The polyisocyanates (P) are preferably compounds of the following types:

1) Polyisocyanates having isocyanurate groups and derived from aromatic, aliphatic and/or cycloaliphatic diisocyanates. Particular preference is here given to the corresponding aliphatic and/or cycloaliphatic isocyanatoisocyanurates and in particular those based on hexamethylene diisocyanate and isophorone diisocyanate. These isocyanurates are, in particular, trisisocyanatoalkyl or trisisocyanatocycloalkyl isocyanurates which represent cyclic trimers of the diisocyanates or mixtures with their higher homologues having more than one isocyanurate ring. The isocyanatoisocyanurates generally have an NCO content of from 10 to 30% by weight, in particular from 15 to 25% by weight, and a mean NCO functionality of from 2.6 to 8.

2) Uretdione diisocyanates having aromatically, aliphatically and/or cycloaliphatically bonded isocyanate groups, preferably aliphatically and/or cycloaliphatically bonded isocyanate groups, and in particular those derived from hexamethylene diisocyanate or isophorone diisocyanate. Uretdione diisocyanates are cyclic dimerization products of diisocyanates. For the purposes of the present invention, the uretdione diisocyanates are obtained in admixture with other polyisocyanates, in particular those mentioned under 1). For this purpose, the diisocyanates can be reacted under reaction conditions under which both uretdiones and the other polyisocyanates are formed, or the uretdiones are formed first and are subsequently converted into the other polyisocyanates or the diisocyanates are firstly converted into the other polyisocyanates and these are subsequently converted into products comprising uretdione groups.

3) The polyisocyanates 1), 2) or 4) to 11) can also, after they have been prepared, be converted into polyisocyanates having biuret groups and aromatically, cycloaliphatically or aliphatically bonded, preferably cycloaliphatically or aliphatically bonded, isocyanate groups. These polyisocyanates having biuret groups generally have an NCO content of from 18 to 22% by weight and a mean NCO functionality of from 2.8 to 6.

4) Polyisocyanates having urethane and/or allophanate groups and having aromatically, aliphatically or cycloaliphatically bonded, preferably aliphatically or cycloaliphatically bonded isocyanate groups, as are obtained, for example, by reaction of an excess of diisocyanate, for example hexamethylene diisocyanate or isophorone diisocyanate, with monohydric or polyhydric alcohols (A). These polyisocyanates having urethane and/or allophanate groups generally have an NCO content of from 12 to 24% by weight and a mean NCO functionality of from 2.5 to 4.5.

5) Polyisocyanates comprising oxadiazinetrione groups, preferably those derived from hexamethylene diisocyanate or isophorone diisocyanate. Such polyisocyanates comprising oxadiazinetrione groups can be obtained from diisocyanate and carbon dioxide.

6) Polyisocyanates comprising iminooxadiazinedione groups, preferably those derived from hexamethylene diisocyanate or isophorone diisocyanate. Such polyisocyanates comprising iminooxadiazinedione groups can be prepared from diisocyanates by means of specific catalysts.

7) Uretonimine-modified polyisocyanates.

8) Carbodiimide-modified polyisocyanates.

9) Hyperbranched polyisocyanates as are known, for example, from DE-A1 10013186 or DE-A1 10013187.

10) Polyurethane-polyisocyanate prepolymers obtained by reaction of diisocyanates and/or polyisocyanates with alcohols.

11) Polyurea-polyisocyanate prepolymers.

In a preferred embodiment of the present invention, the polyisocyanate (P) is selected from the group consisting of isocyanurates, biurets, urethanes and allophanates, preferably from the group consisting of isocyanurates, urethanes and allophanates, particularly preferably from the group consisting of isocyanurates and allophanates.

To prepare urethanes and/or allophanates, the isocyanates (D) are reacted with at least one monohydric or polyhydric alcohol (A), e.g. methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylolpropane, neopentyl glycol, pentaerythritol, 1,4-butanediol, 1,6-hexanediol, 1,2-propanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butanediol, 1,3-butanediol, 1,4-butanediol, 2,4-pentanediol, 3-methyl-1,5-pentanediol, 2,2,4-trimethyl-1,5-pentanediol, 2-methyl-2,4-pentanediol, 2-methyl-1,3-pentanediol, 2-ethyl-1,3-hexanediol, 2-propyl-1,3-heptanediol, 2,4-diethyl-1,3-octanediol, the neopentyl glycol ester of hydroxypivalic acid, ditrimethylolpropane, dipentaerythritol, 2,2-bis(4-hydroxycyclohexyl)propane, 1,1-, 1,2-, 1,3- and 1,4-cyclohexanedimethanol, 1,2-, 1,3- or 1,4-cyclohexanediol or mixtures thereof.

Compounds (A) can also be monofunctional polyalkylene oxide polyether alcohols which are obtainable by alkoxylation of suitable starter molecules.

Suitable starter molecules for preparing such polyalkylene oxide polyether alcohols are thiol compounds, monohydroxy compounds of the general formula

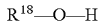

or secondary monoamines of the general formula

where
$R^{19}$, $R^{20}$ and $R^{18}$ are each, independently of one another, $C_1$-$C_{18}$-alkyl, $C_2$-$C_{18}$-alkyl which may optionally be interrupted by one or more oxygen and/or sulfur atoms and/or one or more substituted or unsubstituted imino groups, $C_6$-$C_{12}$-aryl, $C_6$-$C_{12}$-cycloalkyl or a five- to six-membered heterocycle having oxygen, nitrogen and/or sulfur atoms or $R^{19}$ and $R^{20}$ together form an unsaturated, saturated or aromatic ring which may optionally be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

Preference is given to $R^{19}$, $R^{20}$ and $R^{18}$ each being, independently of one another, $C_1$-$C_4$-alkyl, and particular preference is given to $R^{19}$, $R^{20}$ and $R^{18}$ each being methyl.

Examples of suitable monovalent starter molecules are saturated monoalcohols, i.e. monoalcohols which do not comprise any C—C- or C-heteroatom double or triple bonds, e.g. methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxy-methyloxetane or tetrahydrofurfuryl alcohol; aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methylcyclohexylamine and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred starter molecules are alcohols having not more than 6 carbon atoms, particularly preferably not more than 4 carbon atoms, very particularly preferably not more than 2 carbon atoms and in particular methanol.

Alkylene oxides which are suitable for the alkoxylation reaction are ethylene oxide, propylene oxide, isobutylene oxide, vinyloxirane and/or styrene oxide, which can be used in any order (to produce block copolymers) or in admixture (to produce random copolymers) in the alkoxylation reaction.

Preferred alkylene oxides are ethylene oxide, propylene oxide and mixtures thereof, particularly preferably ethylene oxide.

Preferred polyether alcohols are ones based on polyalkylene oxide polyether alcohols which have been prepared using saturated aliphatic or cycloaliphatic alcohols of the abovementioned type as starter molecules. Very particular preference is given to those based on polyalkylene oxide polyether alcohols which have been prepared using saturated aliphatic alcohols having from 1 to 4 carbon atoms in the alkyl radical. Especial preference is given to methanol-initiated polyalkylene oxide polyether alcohols.

The monohydric polyalkylene oxide polyether alcohols generally have an average of at least 2 alkylene oxide units, preferably 5 ethylene oxide units, per molecule in copolymerized form, particularly preferably at least 7 and very particularly preferably at least 10.

The monohydric polyalkylene oxide polyether alcohols generally have an average of up to 90 alkylene oxide units, preferably ethylene oxide units, per molecule in copolymerized form, preferably up to 45, particularly preferably up to 40 and very particularly preferably up to 30.

The molecular weight of the monohydric polyalkylene oxide polyether alcohols is preferably up to 4000 g/mol, particularly preferably up to 2000 g/mol, very particularly preferably up to 1000 g/mol. The molecular weight of the monohydric polyalkylene oxide polyether alcohols is preferably at least 300 g/mol, particularly preferably at least 400 g/mol and very particularly preferably at least 500 g/mol. Very particular preference is given to molecular weights of from 400 to 1200 g/mol, in particular from 500 to 1000 g/mol.

Preferred polyether alcohols are thus compounds of the formula

R$^{18}$—O—[—X$_i$—]$_s$—H where

R$^{18}$ is as defined above, s is an integer from 2 to 90, preferably from 5 to 45, particularly preferably from 7 to 40 and very particularly preferably from 10 to 30, and each X$_i$ in which i=1 to s can be selected independently from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group consisting of —CH$_2$—CH$_2$—O—, —CH$_2$—CH(CH$_3$)—O— and —CH(CH$_3$)—CH$_2$—O—, and particularly preferably —CH$_2$—CH$_2$—O—, where Ph is phenyl and Vin is vinyl.

The compounds (A) can also preferably be compounds of the formulae (IIa) to (IId),

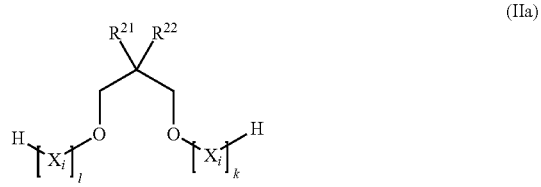

(IIa)

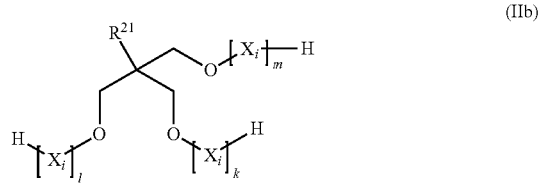

(IIb)

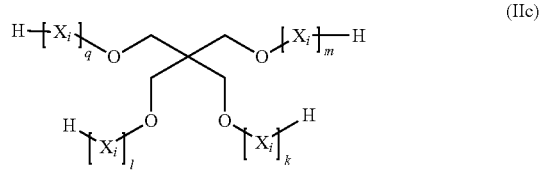

(IIc)

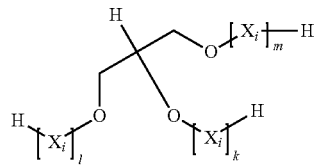

(IId)

where

R$^{21}$ and R$^{22}$ are each, independently of one another, hydrogen or C$_1$-C$_{20}$-alkyl which may optionally be substituted by aryl, alkyl, aryloxy, alkyloxy, heteroatoms and/or heterocycles, k, l, m, q are each, independently of one another, an integer from 1 to 15, preferably from 1 to 10 and particularly preferably from 1 to 7, and each X$_i$ in which i=1 to k, 1 to l, 1 to m and 1 to q can independently have one of the above meanings.

The alcohol (A) is preferably neopentyl glycol, trimethylolpropane, trimethylolethane or pentaerythritol or glycerol which is alkoxylated by from 1 to 30, particularly preferably from 3 to 20, ethylene oxide, propylene oxide or mixed ethylene oxide and propylene oxide units, in particular exclusively ethylene oxide units.

The proportion of alcohol (A) can be up to 50% by weight, preferably up to 40% by weight, particularly preferably up to 30% by weight and very particularly preferably up to 25% by weight, based on the isocyanate (D).

In a further embodiment of the present invention, it is possible to use only a small proportion of alcohol (A) based on the isocyanate (D), for example 0.25-10% by weight, preferably from 0.5 to 8% by weight, particularly preferably from 0.75 to 5% by weight and very particularly preferably 1-3% by weight.

In a preferred embodiment, the alcohol is a compound having at least one, preferably precisely one, group which is reactive toward isocyanate and at least one, for example from one to six, preferably from one to five, particularly preferably from one to four and very particularly preferably one, two or three, unsaturated groups which can be polymerized by a free-radical mechanism, preferably acrylate or methacrylate groups.

Groups which are reactive toward isocyanate can be, for example, hydroxy, mercapto, amino or monosubstituted imino, preferably hydroxy or amino, particularly preferably hydroxy.

Examples of such compounds are monoesters of methacrylic acid or preferably acrylic acid with diols or polyols which preferably have from 2 to 20 carbon atoms and at least two hydroxy groups, e.g. ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly-THF having a molecular weight of from 162 to 2000, poly-1,3-propanediol having a molecular weight of from 134 to 400 or polyethylene glycol having a molecular weight of from 238 to 458.

Preference is given to 2-hydroxyethyl (meth)acrylate, 2- or 3-hydroxypropyl (meth)acrylate, 1,4-butanediol mono(meth)acrylate, neopentyl glycol mono(meth)acrylate, 1,5- pentanediol mono(meth)acrylate, 1,6-hexanediol mono(meth)acrylate, glyceryl mono- and di(meth)acrylate, trimethylolpropane mono- and di(meth)acrylate, pentaerythritol mono-, di- and tri(meth)acrylate, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate or 2-thioethyl (meth)acrylate. Particular preference is given to 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl (meth)acrylate and also the monoacrylates of polyethylene glycol having a molar mass of from 106 to 238.

Catalyst (K)

Trimerization catalysts which are suitable for the process of the invention include, for example,
- alkali metal phenoxides of the type described in GB-B 1,391,066 or GB-B 1,386,399;
- aziridine derivatives in combination with tertiary amines of the type described in U.S. Pat. No. 3,919,218;
- quaternary ammonium carboxylates of the type described in the U.S. Pat. Nos. 4,454,317 and 4,801,663;
- quaternary ammonium phenoxides having a zwitterionic structure of the type described in U.S. Pat. No. 4,335,219;
- ammonium phosphonates and phosphates of the type described in U.S. Pat. No. 4,499,253;
- alkali metal carboxylates, for example cobalt naphthenate, sodium benzoate, sodium acetate, potassium formate and as described in DE-A 3,219,608;
- basic alkali metal salts complexed with acyclic organic compounds, as are described in U.S. Pat. No. 4,379,905, for instance potassium acetate complexed with a polyethylene glycol comprising an average of from 5 to 8 ethylene oxide units;
- basic alkali metal salts complexed with crown ethers, as are described in U.S. Pat. No. 4,487,928;
- compounds comprising aminosilyl groups, e.g. aminosilanes, diaminosilanes, silylureas and silazanes, as described in U.S. Pat. No. 4,412,073;
- mixtures of alkali metal fluorides and quaternary ammonium or phosphonium salts, as described in EP-A 355479,
- tertiary amines, for example triethylamine, N,N-dimethylbenzylamine, triethylenediamine, 2,4,6-tris(dimethylaminomethyl)phenol and 1,3,5-tris(dimethylaminopropyl)-S-hexahydrotriazine,
- N-heterocyclic carbenes (NHCs) as in WO 2005/113626,
- alkali metal oxides, alkali metal hydroxides and strong organic bases, e.g. alkali metal alkoxides,
- tin, zinc or lead salts of alkylcarboxylic acids;
- organic metal salts of the formula $(A)_n\text{-R-O-CO-O}^{\ominus}M^{\oplus}$ as described in U.S. Pat. No. 3,817,939, where:

A is a hydroxyl group or a hydrogen atom,
n is from 1 to 3,
R is a polyfunctional linear or branched, aliphatic or aromatic hydrocarbon radical and
$M^{\oplus}$ is a cation, e.g. an alkali metal cation or a quaternary ammonium cation such as tetraalkylammonium, and
quaternary hydroxyalkylammonium compounds of the formula

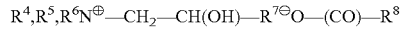

as catalyst as described in DE-A-26 31 733 (U.S. Pat. No. 4,040,992).

Particularly useful catalysts for the process are quaternary ammonium salts corresponding to the formula

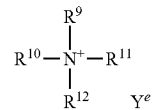

where
$Y^{\ominus}$=carboxylate ($R^{13}COO^-$), fluoride ($F^-$), carbonate ($R^{13}O(CO)O^-$) or hydroxide ($OH^-$),
as are described for $Y^-=OH^-$ in U.S. Pat. No. 4,324,879 and in DE-A 2,806,731 and DE-A 2,901,479.

The radical $Y^{\ominus}$ is preferably a carboxylate, carbonate or hydroxide and particularly preferably a carboxylate or hydroxide.

In this radical, $R^{13}$ is hydrogen, $C_1$-$C_{20}$-alkyl, $C_6$-$C_{12}$-aryl or $C_7$-$C_{20}$-arylalkyl, each of which may optionally be substituted.

$R^{13}$ is preferably hydrogen or $C_1$-$C_8$-alkyl.

Preferred quaternary ammonium salts are those in which the radicals $R^9$ to $R^{12}$ are identical or different alkyl groups which have from 1 to 20, preferably from 1 to 4, carbon atoms and may optionally be substituted by hydroxyl or phenyl groups.

It is also possible for two of the radicals $R^9$ to $R^{12}$ together with the nitrogen atom and, if appropriate, a further nitrogen or oxygen atom to form a heterocyclic, five-, six- or seven-membered ring. The radicals $R^9$ to $R^{11}$ can in each case also be ethylene radicals which together with the quaternary nitrogen atom and a further tertiary nitrogen atom form a bicyclic triethylenediamine structure, provided that the radical $R^{12}$ is then a hydroxyalkyl group which has from 2 to 4 carbon atoms and in which the hydroxyl group is preferably located in the 2-position relative to the quaternary nitrogen atom. The hydroxy-substituted radical or radicals can also comprise other substituents, for example $C_1$-$C_4$-alkyloxy substituents.

Here, the ammonium ions can also be part of a monocyclic or polycyclic ring system, for example a ring system derived from piperazine, morpholine, piperidine, pyrrolidine, quinuclidine or diazabicyclo[2.2.2]octane.

Examples of groups $R^9$ to $R^{12}$ having from 1 to 20 carbon atoms are, independently of one another, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, chloromethyl, 2-chloroethyl, trichloromethyl, trifluoromethyl, 1,1-dimethyl-2-chloroethyl, 2-methoxyisopropyl, 2-ethoxyethyl, 2-hydroxyethyl, 2-hydroxypropyl, 3-hydroxypropyl, 4-hydroxybutyl, 6-hydroxyhexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, methylnaphthyl, isopropylnaphthyl, chloronaphthyl, 2,6-dimethylphenyl, 2,4,6-trimethylphenyl, 2,6-dimethoxyphenyl, 2,6-dichlorophenyl, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, chlorocyclohexyl, dichlorocyclohexyl, dichlorocyclopentyl, norbornyl and norbornenyl.

Preference is given to the radicals $R^9$ to $R^{12}$ each being, independently of one another, $C_1$-$C_4$-alkyl. $R^{12}$ may additionally be benzyl or a radical of the formula

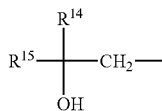

where $R^{14}$ and $R^{15}$ can each be, independently of one another, hydrogen or $C_1$-$C_4$-alkyl.

Particularly preferred radicals $R^9$ to $R^{12}$ are, independently of one another, methyl, ethyl and n-butyl and in the case of $R^{12}$ additionally benzyl, 2-hydroxyethyl and 2-hydroxypropyl.

The following catalysts can preferably be used for the process of the invention:

Quaternary ammonium hydroxides, preferably N,N,N-trimethyl-N-benzylammonium hydroxide and N,N,N-trimethyl-N-(2-hydroxypropyl)ammonium hydroxide, as described in DE-A-38 06 276.

Hydroxyalkyl-substituted quaternary ammonium hydroxides as described in EP-A-10 589 (U.S. Pat. No. 4,324,879).

Organic metal salts of the formula $(A)_n$-R—O—CO—$O^{\ominus}M^{\oplus}$ as described in U.S. Pat. No. 3,817,939, where A is a hydroxyl group or a hydrogen atom, n is from 1 to 3, R is a polyfunctional linear or branched aliphatic or aromatic hydrocarbon radical and M is a cation of a strong base, e.g. an alkali metal cation or a quaternary ammonium cation such as tetraalkylammonium.

In this text, $C_1$-$C_{20}$-alkyl which may optionally be substituted by aryl, alkyl, aryloxy, alkyloxy, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, $C_6$-$C_{12}$-aryl which may optionally be substituted by aryl, alkyl, aryloxy, alkyloxy, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may optionally be substituted by aryl, alkyl, aryloxy, alkyloxy, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, divalent $C_2$-$C_9$-alkylene radicals which may also be part of an arylene or cycloalkylene radical are, for example, 1,2-ethylene, 1,2-propylene, 1,3-propylene, 1,6-hexylene, 2,2,4-trimethylhexylene, 1,4-cyclohexylene, isopropylidene-1,4-dicyclohexylene, 1,2-, 1,3- or 1,4-phenylene, 4,4'-biphenylene, 4,4'-bisphenylmethylene, 1,3-, 1,4- or 1,5-naphthylene, 3,3'-dimethyl-4,4'-diphenylene, 3,3'-dichloro-4,4'-diphenylene, 2,4- or 2,6-pyridyl, 1,4-anthraquinonediyl, m- or p-tolylene, 4,6-dimethyl-1,3-phenylene, 4,6-dichloro-1,3-phenylene, 5-chloro-1,3-phenylene, 5-hydroxy-1,3-phenylene, 5-methoxy-1,3-phenylene, 2,3-dimethyl-1,4-phenylene, m- or p-xylylene, methylenedi-p-phenylene, isopropylidenedi-p-phenylene, thiodi-p-phenylene, dithio-di-p-phenylene, sulfodi-p-phenylene, carbonyldi-p-phenylene, and $C_1$-$C_4$-alkyl, for example, methyl, ethyl, propyl, isopropyl, n-butyl, sec-butyl or tert-butyl.

These quaternary ammonium catalysts are prepared in a known manner by reacting a tertiary amine with an alkylene oxide in an aqueous-alcoholic medium (cf. U.S. Pat. No. 3,995,997, column 2, lines 19-44).

Examples of suitable tertiary amines are trimethylamine, tributylamine, 2-dimethylaminoethanol, triethanolamine, dodecyldimethylamine, N,N-dimethylcyclohexylamine, N-methylpyrrolidine, N-methylmorpholine and 1,4-diazabicyclo[2.2.2]octane. Examples of suitable alkylene oxides are ethylene oxide, propylene oxide, 1,2-butylene oxide, styrene oxide and methoxypropylene, ethoxypropylene or phenoxypropylene oxide.

The most preferred catalysts (K) are N,N,N,N-tetramethylammonium hydroxide, N,N,N,N-tetraethylammonium hydroxide, N,N,N,N-tetra-n-butylammonium hydroxide, N,N,N-trimethyl-N-(2-hydroxyethyl)ammonium hydroxide, N,N,N-trimethyl-N-(2-hydroxypropyl)ammonium hydroxide, N,N,N-trimethyl-N-benzylammonium hydroxide, N-(2-hydroxypropyl)-N,N,N-trimethylammonium 2-ethylhexanoate (DABCO TMR®) and N-(2-hydroxypropyl)-N,N,N-trimethylammonium 2-formate (DABCO TMR®-2) from Air Products.

Preference is also given to trimerization catalysts as are known from DE 10 2004 012571 A1, there particularly paragraphs [0017] to [0027], and from EP-A1 668 271, there particularly page 4, line 16 to page 6, line 47, which is hereby incorporated by reference into the present disclosure.

The catalysts (K) are generally used in amounts of from about 0.0005 to 5% by weight, preferably from about 0.002 to 2% by weight, based on the isocyanate used. If, for example, a preferred catalyst such as N,N,N-trimethyl-N-(2-hydroxypropyl)ammonium hydroxide is used, amounts of from about 0.0005 to 1% by weight, preferably from about 0.001 to 0.02% by weight, based on the starting isocyanate, are generally sufficient.

The catalysts can be used in pure form or in solution. To aid handling, the catalyst can be dissolved in a solvent. Suitable solvents for this purpose are, for example, alcohols, in particular diols, ketones, ethers and esters. The solvents mentioned in the present text which are inert toward isocyanate groups are suitable as solvents, depending on the type of catalyst. Dimethylformamide or dimethyl sulfoxide can likewise be used as solvent for the catalysts.

For example, the abovementioned catalysts DABCO TMR® and DABCO TMR®-2 are preferably used as an about 33-75% strength by weight solution in diethylene glycol, dipropylene glycol or preferably ethylene glycol.

It is also conceivable to use monoalcohols, preferably alkanols, as solvents, for example methanol, ethanol, isopropanol, n-propanol, n-butanol, isobutanol, sec-butanol, tert-butanol, n-hexanol, n-heptanol, n-octanol, n-decanol, n-dodecanol (lauryl alcohol) or 2-ethylhexanol.

Further suitable catalysts are aminosilyl compounds as are described in U.S. Pat. No. 4,412,073, there particularly column 3, lines 2 to 33 and column 4, line 1 to column 6, line 4, which is hereby explicitly incorporated by reference into the present disclosure. Among these aminosilyl compounds, methylaminotrimethylsilane, dimethylaminotrimethylsilane, diethylaminotrimethylsilane, dibutylaminotrimethylsilane, diethylaminodimethylvinylsilane, diethylamino dimethylphenylsilane, bis-(dimethylamino) dimethylsilane, bis(diethylamino)dimethylsilane, bis(dibutylamino) dimethylsilane, bis(dimethylamino)methylphenylsilane, N-methyl-N-trimethylsilyl-N'-methyl-N'-butylurea, N-methyl-N-trimethylsilyl-N',N'-dimethylurea, N-ethyl-N-trimethylsilyl-N',N'-dimethylurea and N-butyl-N-trimethylsilyl-N',N'-dimethylurea are particularly useful.

Very particularly useful compounds are hexamethyldisilazane, heptamethyldisilazane, hexaethyldisilazane, 1,3-diethyl-1,1,3,3-tetramethyldisilazane, 1,3-divinyl-1,1,3,3-tetramethyldisilazane, 1,3-diphenyl-1,1,3,3-tetramethyldisilazane and in particular hexamethyldisilazane.

Solvent (L)

The reaction can optionally be carried out in at least one solvent or the polyisocyanate (P) obtained can, after the unreacted isocyanate (D) has been separated off, be formulated in at least one solvent.

Examples of such solvents are aromatic and/or (cyclo)aliphatic hydrocarbons and mixtures thereof, halogenated hydrocarbons, esters and ethers.

Preference is given to aromatic hydrocarbons, (cyclo)aliphatic hydrocarbons, alkyl alkanoates, alkoxylated alkyl alkanoates and mixtures thereof.

Particular preference is given to monoalkylated or polyalkylated benzenes and naphthalenes, alkyl alkanoates and alkoxylated alkyl alkanoates and mixtures thereof.

As aromatic hydrocarbon mixtures, preference is given to those which comprise predominantly aromatic $C_7$-$C_{14}$-hydrocarbons and can comprise a boiling range of from 110 to 300° C., particularly preferably toluene, o-, m- or p-xylene, trimethylbenzene isomers, tetramethylbenzene isomers, ethylbenzene, cumene, tetrahydronaphthalene, and mixtures comprising these.

Examples are the Solvesso® grades from ExxonMobil Chemical, in particular Solvesso® 100 (CAS No. 64742-95-6, predominantly $C_9$- and $C_{10}$-aromatics, boiling range about 154-178° C.), 150 (boiling range about 182-207° C.) and 200 (CAS No. 64742-94-5), and also the Shellsol® grades from Shell, Caromax® (e.g. Caromax® 18) from Petrochem Carless and Hydrosol from DHC (e.g. as Hydrosol® A 170). Hydrocarbon mixtures comprising paraffins, cycloparaffins and aromatics are also commercially available under the names Kristallöl (for example Kristallöl 30, boiling range about 158-198° C., or Kristallöl 60: CAS No. 64742-82-1), petroleum spirit (for example likewise CAS No. 64742-82-1) or Solventnaphtha (light: boiling range about 155-180° C., heavy: boiling range about 225-300° C.). The aromatics content of such hydrocarbon mixtures is generally above 90% by weight, preferably above 95% by weight, particularly preferably above 98% by weight and very particularly preferably above 99% by weight. It can be useful to use hydrocarbon mixtures having a particularly reduced content of naphthalene.

The content of aliphatic hydrocarbons is generally less than 5% by weight, preferably less than 2.5% by weight and particularly preferably less than 1% by weight.

Halogenated hydrocarbons are, for example, chlorobenzene and dichlorobenzene or isomer mixtures thereof.

Esters are, for example, n-butyl acetate, ethyl acetate, 1-methoxypropyl 2-acetate and 2-methoxyethyl acetate.

Ethers are, for example, THF, dioxane and the dimethyl, diethyl or di-n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin and isomer mixtures of straight-chain or branched alkanes and/or cycloalkanes, for example petroleum ether or ligroin.

Preference is also given to n-butyl acetate, ethyl acetate, 1-methoxypropyl 2-acetate, 2-methoxyethyl acetate and their mixtures, in particular with the abovementioned aromatic hydrocarbon mixtures.

Such mixtures can be produced in a volume ratio of from 5:1 to 1:5, preferably in a volume ratio of from 4:1 to 1:4, particularly preferably in a volume ratio of from 3:1 to 1:3 and very particularly preferably in a volume ratio of from 2:1 to 1:2.

Preferred examples are butyl acetate/xylene, methoxypropyl acetate/xylene 1:1, butyl acetate/Solvent naphtha 100 1:1, butyl acetate/Solvesso® 100 1:2 and Kristallöl 30/Shellsol® A 3:1.

Step a) can be carried out batchwise or continuously and can, in a typical embodiment, be carried out, for example, as follows:

In step a), the reaction of the reactants takes place in at least one reaction zone.

For the present purposes, reaction zones are apparatuses and vessels in which the isocyanate is reacted to an extent of at least 10%, preferably at least 15% and particularly preferably at least 20%, in the presence of at least one catalyst.

These can be any reaction zones known for such purposes, for example one or more stirred vessels, one or more tube reactors or combinations thereof. Taylor reactors, annular gap reactors, microreactors, cascades of vessels, reaction extruders and combinations of these reactors are also conceivable.

Stage a) generally comprises two or more backmixed reaction zones, for example from 2 to 6, preferably 2-5, particularly preferably 3-5 and very particularly preferably four. More reaction zones are conceivable but generally bring no significant advantage.

The mean total residence time in stage a) can be up to 7 hours, preferably up to 90 minutes, particularly preferably up to 60 minutes, very particularly preferably up to 45 minutes and in particular up to 30 minutes. A longer residence time is possible but generally brings no advantages.

The mean total residence time in stage a) is generally at least 2 minutes, preferably at least 5 minutes, particularly preferably at least 10 minutes, very particularly preferably at least 15 minutes and in particular at least 20 minutes.

The reaction zone can be backmixed or not backmixed, and combinations thereof are also conceivable.

The reaction zones can be, for example, a plurality of stirred vessels connected in series (cascade of stirred vessels) or at least one stirred vessel which is divided into a plurality of zones by means of a suitable division of the reaction volume, for example by means of dividing plates, (cascaded stirred vessel) or combinations thereof.

The volume-based power input per backmixed reaction zone should be not less than 0.1 W/l, preferably not less than 0.2 W/l and particularly preferably not less than 0.5 W/l. In general, it is sufficient to use up to 10 W/l, preferably up to 5 W/l, particularly preferably up to 3 W/l and very particularly preferably up to 2 W/l. The specific power input indicated here is the power introduced per liter of reaction space volume of the reactor.

The power can be introduced by means of all possible types of stirrer, e.g. propeller stirrers, inclined blade stirrers, anchor stirrers, disk stirrers, turbine stirrers or beam stirrers. Preference is given to using disk stirrers and turbine stirrers.

The stirred vessel can be operated with or without baffles. It is preferably operated using baffles. Operation is usually carried out using from 1 to 10 baffles, preferably from 2 to 6, particularly preferably 2, 3 or 4, baffles per segment.

In the case of a cascaded stirred vessel, it is also possible for a plurality of stirrers to be installed on the shaft. Preference is given to using one stirrer on the shaft per segment of the cascade. The diameter of the stirring elements is from 0.1 to 0.9 times the diameter of the stirred vessel, preferably from 0.2 to 0.6 times the diameter of the stirred vessel.

In a preferred embodiment, mixing and energy input in/into the reaction zones can also be effected by means of at least one pumped circuit which can, if appropriate, be heated/cooled by means of at least one heat exchanger installed in this pumped circuit.

The stirred vessels can in each case be, for example, vessels having double-wall heating, welded-on full or half tubes, or internal heating coils. As an alternative, vessels having external heat exchangers and natural convection in which circulatory flow is brought about without mechanical aids or forced circulation (using a pump).

Suitable circulatory vaporizers are known to those skilled in the art and described, for example in R. Billet, Verdampfertechnik, HTB-Verlag, Bibliographisches Institut Mannheim, 1965, 53. Examples of circulatory vaporizers are shell-and-tube heat exchangers, plate heat exchangers, etc.

As pumps, forced transport pumps, for example gear pumps, tube pumps, screw pumps, excentric screw pumps, spindle pumps or piston pumps or centrifugal pumps, are preferably used in the process of the invention in all streams in which an isocyanate-comprising stream is conveyed.

Forced-transport pumps are preferably used here for conveying streams which have a viscosity of 250 mPas or more, particularly preferably 300 mPas or more, very particularly preferably 400 mPas or more and in particular 500 mPas or more. Centrifugal pumps are preferably used for conveying streams having a viscosity of up to 300 mPas, particularly preferably up to 250 mPas and very particularly preferably up to 200 mPas.

Of course, a plurality of heat exchangers can also be present in the circuit.

The backmixed reaction zones are generally provided with heating. The heating can be, for example, via jacket heating, welded-on full or half tubes, via internal tubes or plates and/or via a circuit having an external heat exchanger, e.g. tube or plate heat exchanger. A circuit having an external heat exchanger is preferably used for the purposes of the invention. Uniform mixing of the reaction solution is effected in a known manner, e.g. by stirring, pumped circulation, forced or natural convection, preferably by means of forced or natural convection.

If appropriate, further catalyst (K) and/or isocyanate (D), if appropriate in a solvent (L), can be introduced into stage a). This can then be effected into each reaction zone individually and independently.

The catalyst and fresh isocyanate are preferably mixed with one another in a pumped circuit in which the two streams are, for example, brought into contact with one another immediately upstream of a pump. This pumped circuit mixes the contents of the first reaction zone. Recirculation isocyanate can be introduced directly into this first reaction zone or into the second reaction zone.

A further embodiment of the invention relates to the construction of a mixing circuit comprising a pump for pumped circulation of the isocyanate, if appropriate provided with a pump reservoir and/or mixing device. Here, the pump draws in the isocyanate-comprising stream from the pump reservoir and conveys it to the mixing device. Before the stream enters the mixing device, the fresh isocyanate stream is introduced into the isocyanate-comprising stream, but can also be fed into the pump reservoir. To aid the mixing of the fresh isocyanate stream into the isocyanate-comprising pumped circulation stream, it is possible to use a static mixing device.

The isocyanate-comprising stream and the catalyst-comprising stream are then mixed in the mixing device. The output from the mixing device is at least partly conveyed back into the pump reservoir in the embodiment as mixing circuit. The remaining substream of the output is transferred into the reaction zone. Here, the use of the pump reservoir is not absolutely necessary; it merely serves to aid appropriately regulated operation of the pump.

In a preferred embodiment of the invention, a mixing circuit is combined with the reaction zone. For this purpose, an isocyanate-comprising stream is taken from the reaction zone by means of a pump and conveyed to the mixing device. In the mixing device, the catalyst-comprising stream is mixed in. The stream leaving the mixing device is recirculated to the reaction zone. The catalyst stream and the fresh isocyanate stream are either introduced into the isocyanate-comprising stream upstream of the mixing nozzle and/or introduced directly into the reaction zone. Preference is given to premixing the fresh isocyanate stream with the catalyst stream and adding this fresh isocyanate/catalyst mixture to the isocyanate stream upstream of the mixing nozzle, particularly preferably upstream of the pump.

The temperature in the backmixed reactor system is generally from 40° C. to 170° C., preferably from 45° C. to 160° C., particularly preferably from 50 to 150° C. and very particularly preferably from 60 to 140° C.

The transfer of the reaction output from a reaction zone into the following stage can advantageously be carried out using level-regulated valves.

An advantage of the present invention is that the individual reaction zones can be maintained at different temperatures and can be operated using different residence times.

Thus, for example, it can be advantageous to increase the reaction temperature along the reaction zones so that, for example, the temperature in the second reaction zone is 5° C. higher, preferably 10° C. higher, particularly preferably 15° C. higher and very particularly preferably 20° C. higher, than in the first reaction zone.

In a third reaction zone which may be present if appropriate, the temperature can be increased further by 5° C., preferably by 10° C., particularly preferably by 15° C. and very particularly preferably by 20° C.

The reaction according to the invention can be carried out in the presence of carbon dioxide ($CO_2$), with the content generally being 0-2000 ppm by weight, preferably from 0 to 200 ppm by weight.

If carbon dioxide is introduced, it can be passed over the reaction mixture or be passed through the latter, for example by means of an inlet or a frit. However, the carbon dioxide can also be present as a solution in the isocyanate used, so that the introduction of additional carbon dioxide is not necessary.

As an alternative, reaction step a) can also be carried out in at least one tube reactor.

Isocyanate (D) and catalyst (K) are then fed into a reactor system comprising at least one tube reactor.

The tube reactor should be largely backmixing-free. This is achieved, for example, by means of the ratio of the diameter of the tube reactor to its length or by means of internals such as perforated plates, slotted plates or static mixers. The freedom from backmixing is preferably achieved by means of the ratio of length to diameter of the tube reactor.

Suitable tube reactors are all tubes whose length to diameter ratio is greater than 5, preferably greater than 6, particularly preferably greater than 10, very particularly preferably greater than 10 and in particular greater than 50.

The Bodenstein number of such a tube reactor should be, for example, 3 or more, preferably at least 4, particularly preferably at least 5, very particularly preferably at least 8, in particular at least 10 and especially at least 50.

In principle, there is no upper limit to the Bodenstein number; in general, a Bodenstein number up to 600, preferably up to 500, particularly preferably up to 300 and very particularly preferably up to 200, is sufficient.

It is advantageous for a Reynolds number Re of at least 2300, preferably at least 2700, particularly preferably at least 4000, very particularly preferably at least 6000, in particular at least 8000 and especially at least 10 000, to be attained in the tube reactor.

In addition, the power input into the tube reactor should be not less than 0.2 W/l, preferably at least 0.3 W/l, particularly preferably at least 0.5 W/l and very particularly preferably not less than 1 W/l. In general, it is sufficient to introduce up to 100 W/l, preferably up to 50 W/l, particularly preferably up to 30 W/l, very particularly preferably up to 20 W/l and in particular up to 10 W/l. The specific power input indicated here is the power introduced per liter of reaction space volume of the reactor. The power input can be produced by friction of the fluid with the reactor wall or by means of internals which produce a pressure drop, e.g. orifice plates, mixing elements, perforated plates or slotted plates.

The tube reactor can have any orientation in space. It is preferably constructed as a vertical tube reactor through which flow particularly preferably occurs from the bottom upward.

Additional mixing could, if desired, be achieved by mixing the reaction mixture in the tube reactor using a gas or gas mixture which is inert under the reaction conditions, for example a gas or gas mixture having an oxygen content of less than 2% by volume, preferably less than 1% by volume, particularly preferably less than 0.5% by volume; preference is given to nitrogen, argon, helium, nitrogen/noble gas mixtures, particularly preferably nitrogen.

Such a gas phase is preferably conveyed in cocurrent with the liquid phase.

The tube reactor can be operated isothermally or be heated. Heating can be effected by means of jacket heating, welded-on half or full tubes or by means of internal tubes or plates. Heating is preferably effected through the wall.

The tube reactor can, if desired, be divided into a plurality of sections having different temperatures, for example from 2 to 4, preferably 2 or 3, sections.

Thus, for example, it can be useful to increase the reaction temperature along the tube reactor so that, for example, the temperature in the second section is 5° C. higher, preferably 10° C. higher, particularly preferably 15° C. higher and very particularly preferably 20° C. higher, than in the first reaction section.

In a third section which may be present if appropriate, the temperature can be increased further by 5° C., preferably by 10° C., particularly preferably by 15° C. and very particularly preferably by 20° C.

Of course, the tube reactor can also comprise a plurality of pieces of tube connected in series.

In a preferred embodiment, the tube reactor is configured so that the Reynolds number Re of the reaction mixture decreases along the tube reactor from the inlet to the outlet by at least 100 units, preferably by at least 500 units, particularly preferably by at least 1000 units and very particularly preferably by at least 2000 units.

The tube reactor comprises a stretch of tube which can be made up of a single tube or a plurality of connected tubes. The tubes do not all have to have the same diameter; the diameter can change over the length of the reactor in order to react in a targeted manner to the reaction conditions, for example a viscosity which changes as the reaction progresses. The temperature of the tube reactor can be controlled by, for example, the reactor being configured as a double-tube heat exchanger.

To increase the production capacity, it is also possible, according to the invention, for a plurality of tube reactors to be connected in parallel.

If appropriate, further catalyst, isocyanate and/or solvent can be introduced into the tube reactor at one or more points, for example at the beginning and in the middle of the tube reactor.

The mean residence time in the tube reactor is generally at least 1 minute, preferably at least 2 minutes and particularly preferably at least 3 minutes.

The mean residence time in the tube reactor is generally up to 60 minutes, preferably up to 45 minutes and particularly preferably up to 30 minutes.

The temperature in the tube reactor is generally from 40° C. to 150° C., preferably from 45° C. to 130° C. and particularly preferably from 50 to 120° C., with the temperature being able to be gradated, as indicated above.

The pressure in the tube reactor is generally not more than 10 bar abs, preferably not more than 7 bar abs, particularly preferably not more than 5 bar abs, very particularly preferably not more than 3 bar abs and in particular not more than 2 bar abs.

The pressure in the tube reactor should be at least 0.9 bar abs, preferably at least atmospheric pressure.

The transfer of the reaction output into the next stage can advantageously be effected via pressure maintenance valves; the pressure in the tube reactor should generally be at least 0.1 bar above the pressure prevailing in stage d). If this is not the case, the transfer can be effected, for example, by means of a pump or barometrically. Particular preference is given to using level-regulated valves.

In a preferred embodiment of the invention, the interior walls of the tube reactor are hydraulically smooth.

The following applies to compounds (S):

X can preferably be O, NH or $NR^3$, particularly preferably O or NH and very particularly preferably O.

According to the invention, it is critical that the radical $R^1$ in the compounds (S) has at least one group which is reactive toward isocyanate.

When the radicals $R^1$ and $R^2$ are joined to one another, the compound (S) is preferably a cyclic urea (X=NH or $NR^3$)

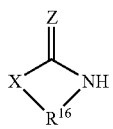

or an oxazolidinone (X=O),

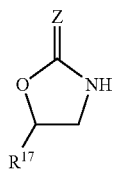

where

Z is oxygen (O) or sulfur (S), preferably oxygen, $R^{16}$ is a $C_2$-$C_6$-alkylene radical substituted by at least one group which is reactive toward isocyanate and $R^{17}$ is a straight-chain or branched $C_1$-$C_4$-alkyl radical which is substituted by at least one group which is reactive toward isocyanate.

Preferred oxazolidinones are those in which $R^{17}$ is 4-hydroxyphenylmethyl, 3-indolylmethyl, carboxymethyl, 2-carboxyethyl, amidocarboxymethyl, 2-amidocarboxyethyl, hydroxymethyl, 1-hydroxyethyl, thiomethyl, 4-aminobutyl, 3-guanidinopropyl or (1,3-imidazol-4-yl)methyl.

Furthermore, the compound (S) used can be a carbamate obtainable by 1) reaction of an amine (M) with a carbonate (C) and 2) if appropriate, purification of the reaction mixture obtainable from 1).

Amines here are ammonia or primary amines; carbonates are O,O'-disubstituted carbonates having the structural element —O—C(=O)—O—.

Very particularly preferred compounds (S) are those which are obtainable by means of a reaction according to formula (III),

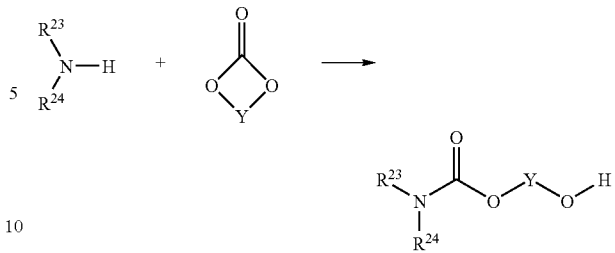

where $R^{23}$ is hydrogen, $R^{24}$ is hydrogen, $C_1$-$C_{20}$-alkyl, $C_2$-$C_{20}$-alkyl which may optionally be interrupted by one or more oxygen and/or sulfur atoms and/or one or more substituted or unsubstituted imino groups, $C_2$-$C_{18}$-alkenyl, $C_6$-$C_{12}$-aryl, $C_5$-$C_{12}$-cycloalkyl or a five- to six-membered heterocycle having oxygen, nitrogen and/or sulfur atoms, where the radicals mentioned may each be substituted by aryl, alkyl, aryloxy, alkyloxy, heteroatoms and/or heterocycles, Y is $C_2$-$C_{20}$-alkylene, $C_5$-$C_{12}$-cycloalkylene or $C_2$-$C_{20}$-alkylene which may be interrupted by one or more oxygen and/or sulfur atoms and/or one or more substituted or unsubstituted imino groups and/or by one or more cycloalkyl, —(CO)—, —O(CO)O—, —(NH)(CO)O—, —O(CO)(NH)—, —O(O)— or —(CO)O— groups, where the radicals mentioned may each be substituted by aryl, alkyl, aryloxy, alkyloxy, heteroatoms and/or heterocycles.

$R^{24}$ is preferably hydrogen, $C_1$-$C_{12}$-alkyl or $C_5$-$C_6$-cycloalkyl; $R^{24}$ is particularly preferably hydrogen, $C_1$-$C_4$-alkyl or $C_5$-$C_6$-cycloalkyl and very particularly preferably hydrogen or $C_1$-$C_4$-alkyl.

Y is preferably $C_2$-$C_{10}$-alkylene, particularly preferably $C_2$-$C_6$-alkylene, very particularly preferably $C_2$-$C_4$-alkylene, in particular $C_2$-$C_3$-alkylene and especially $C_2$-alkylene, where the radicals mentioned may each be substituted by aryl, alkyl, aryloxy, alkyloxy, heteroatoms and/or heterocycles.

Examples of $R^{24}$ are hydrogen, methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, 2-ethylhexyl, cyclopentyl, cyclohexyl, cyclooctyl, cyclododecyl, 2-hydroxyethyl, 2-hydroxypropyl and 1-hydroxypropyl.

Examples of Y are 1,2-ethylene, 1,2-propylene, 1,1-dimethyl-1,2-ethylene, 1-hydroxy methyl-1,2-ethylene, 2-hydroxy-1,3-propylene, 1,3-propylene, 1,4-butylene, 1,6-hexylene, 2-methyl-1,3-propylene, 2-ethyl-1,3-propylene, 2,2-dimethyl-1,3-propylene and 2,2-dimethyl-1,4-butylene; preference is given to 1,2-ethylene, 1,2-propylene, 1,3-propylene, particularly preferably 1,2-ethylene and 1,2-propylene and very particularly preferably 1,2-ethylene.

Examples of amines (M) are ammonia, methylamine, ethylamine, isopropylamine, n-butylamine, tert-butylamine, monoethanolamine, diethanolamine, propanolamine, cyclopentylamine, cyclohexylamine, aniline, ethylenediamine, diethylenetriamine, triethylenetetramine and tetraethylenepentamine.

Examples of carbonates (C) are ethylene carbonate, 1,3-propylene carbonate, 1,2-propylene carbonate and glyceryl carbonate (4-hydroxymethyl)ethylene carbonate).

The reaction of an amine (M) with a carbonate (C) is known per se, for example from U.S. Pat. No. 4,820,830, column 4, line 44 to column 5, line 9, and is not restricted.

The amine (M) and the carbonate (C) are typically reacted with one another in a stoichiometry of from 0.7 to 1.2 mol of amine: 1 mol of carbonate, preferably in a molar ratio 0.8-1.2:1, particularly preferably 0.9-1.1:1, very particularly preferably 0.95-1.1:1 and in particular 1:1.

The reaction is generally carried out at a temperature of from 0 to 120° C., particularly preferably from 20 to 100° C., very particularly preferably from 30 to 80° C. and especially preferably from 40 to 80° C.

The reaction is generally complete within a period of 12 hours, preferably within a period of from 15 minutes to 10 hours, particularly preferably from 30 minutes to 8 hours, very particularly preferably from 45 minutes to 6 hours and in particular from 1 to 4 hours.

The reaction can be carried out without solvent or in the presence of a solvent, for example alcohols, ethers, ketones, hydrocarbons or water, preferably without solvent.

The reaction mixture obtainable from 1) can, if desired, be purified in a further step 2), for example by filtration, distillation, rectification, chromatography, treatment with ion exchangers, adsorbents, a neutral, acidic and/or alkaline scrub, stripping or crystallization.

Particular preference is given to compounds (S) in which the radicals $R^1$ and $R^2$ are not joined to one another.

$R^1$ and $R^2$ are preferably selected independently from the group consisting of hydrogen and optionally substituted $C_1$-$C_4$-alkyl, as long as at least one of these radicals has at least one group which is reactive toward isocyanate.

Here, $R^1$ is not H when X=O or S.

Radicals $R^1$ or $R^2$ of this type which bear a group which is reactive toward NCO are, for example, radicals bearing mercapto, amino, monosubstituted amino or hydroxy groups, particularly preferably radicals bearing a hydroxy group, very particularly preferably radicals which bear a hydroxy group in position 2. The 2-hydroxypropyl radical can bear the methyl group in position 1 or 2 or be any mixture of the isomers.

In particular, the radical $R^1$ is selected from the group consisting of 2-hydroxyethyl and 2-hydroxypropyl.

Preferred individual compounds (S) are O-2-hydroxyethyl carbamate and O-2-hydroxypropyl carbamate.

To aid metering, it can be advantageous to dissolve the compound (S) in at least one solvent, for example one of the abovementioned solvents (L) or preferably in an alcohol, particularly preferably an alkanol, for example as an at least 5% strength by weight solution, preferably an at least 10% strength by weight solution, particularly preferably an at least 15% strength by weight solution and very particularly preferably an at least 20% strength by weight solution.

The upper limit is imposed only by the solubility limit of (S) in the solvent.

To stop the reaction in step b), the compound (S) is used in a molar ratio of, for example, from 0.5 to 30, particularly preferably from 0.6 to 3, very particularly preferably from 0.8 to 2, based on the amount of catalyst (K) used.

b) Stopping of the Reaction

After the desired degree of conversion has been reached, the reaction is stopped by deactivation of the catalyst by addition of the compound (S).

The conversion can be chosen differently as a function of the isocyanate used. In general, a conversion of from 10 to 60% (based on the NCO content before the reaction) is sought, preferably from 10 to 40%.

The addition of the stopping agent (S) is generally effected at the reaction temperature but can also be carried out at higher or lower temperature, for example up to 30° C. lower, preferably up to 20° C. lower and particularly preferably up to 10° C. lower.

c) Separation of the Unreacted Isocyanate (D) from the Reaction Mixture Obtained in this Way The polyisocyanate-comprising reaction mixture produced in this way is finally freed of any solvent or diluent present and/or preferably of excess, unreacted isocyanates in a manner known per se in a step c), for example by means of thin film distillation at a temperature of from 90 to 220° C., if appropriate under reduced pressure, if appropriate with additional passage of inert stripping gas through the mixture, so that the polyisocyanates having isocyanurate groups can be obtained with a content of monomeric isocyanates of, for example, less than 1.0% by weight, preferably less than 0.5% by weight, particularly preferably less than 0.3% by weight, very particularly preferably less than 0.2% by weight and in particular not more than 0.1% by weight.

Apparatuses used for this purpose are flash evaporators, falling film evaporators, thin film evaporators and/or short path evaporators; if appropriate these can be superposed by a short column.

The distillation is generally carried out at a pressure of from 0.1 to 300 hPa, preferably below 200 hPa and particularly preferably below 100 hPa.

In a preferred embodiment, the distillation is carried out in a plurality of stages, for example from 2 to 5 stages, preferably from 2 to 4 stages and particularly preferably 3 or 4 stages.

Here, the pressure is advantageously decreased from stage to stage, for example commencing at 300-500 hPa via 100-300 hPa to 10-100 hPa and subsequently to 0.1-10 hPa.

The temperature in the individual distillation stages is in each case from 90 to 220° C.

The first stage is advantageously carried out in a simple apparatus, for example a circulatory vaporizer, flash evaporator or candle vaporizer, and the subsequent stages are carried out in more complicated apparatus, for example in falling film evaporators, thin film evaporators, for example Sambay® or Luwa vaporizers, or short path evaporators. It is advantageous to undertake measures in terms of the apparatus by means of which the residence time of the streams and thus the thermal stress on them is reduced, for example by omission of intermediate vessels or reservoirs, short pipe distances or very small volumes of liquid phase.

The monomeric isocyanate distillate which has been separated off is preferably recirculated to stage a) and, supplemented by freshly introduced isocyanate, reused in the reaction.

If necessary, this recirculated distillate can be subjected to a treatment to improve the color number, for example a filtration through filters, activated carbon or aluminum oxide.

The finished product can then, if desired, finally be mixed with at least one solvent, preferably with one of the abovementioned solvents (L).

An advantage of the process of the invention is that the use of the compounds (S) to stop the reaction introduces no foreign atoms, i.e. atoms other than atoms from the group consisting of hydrogen, carbon, nitrogen and oxygen, into the reaction mixture. In the case of a conventional termination, these are, for example, phosphorus (P) when the reaction is stopped by means of dialkyl phosphates or chlorine (Cl) when the reaction is stopped using benzoyl chloride.

Furthermore, a lower viscosity increase and/or a smaller increase in the color number on storage for a number of weeks is found in the case of the polyisocyanates (P) which have been obtained according to the invention than in the case of polyisocyanates whose preparative reaction is stopped, for example, by means of dialkyl phosphates or benzoyl chloride.

The polyisocyanates obtained according to the invention can be used for producing polyurethanes and polyurethane surface coatings, for example for one-component, two-component, radiation-curable or powder coating systems, and also surface coatings produced therewith for coating various substrates such as wood, wood veneer, paper, board, cardboard, textile, leather, nonwovens, polymer surfaces, glass, ceramic, mineral building materials, metals or coated metals.

When used in coating compositions, the polyisocyanates obtained according to the invention can be used, in particular, in primers, fillers, pigmented topcoats, base coatings and clear varnishes in the field of automobile repairs or coating of large vehicles. Such coating compositions are particularly useful for applications in which particularly high application reliability, exterior weathering resistance, optics and resistance to solvents, chemicals and water are required, for example in automobile repairs and coating of large vehicles.

Such coating compositions are suitable as or in exterior coatings, i.e. applications in which they are exposed to daylight, preferably parts of buildings, interior coatings, coatings on (large) vehicles and aircraft and industrial applications, bridges, buildings, electricity pylons, tanks, containers, pipelines, power stations, chemical plants, ships, cranes, posts, sheet piling, valves, pipes, fittings, flanges, couplings, halls, roofs and structural steel. In particular, the coating compositions of the invention are used as or in clear varnishes and topcoats for automobiles. Further preferred fields of application are can coating and coil coating.

They are particularly suitable as primers, fillers, pigmented topcoats and clear varnishes in the field of industrial, wood, automobile, in particular OEM, coating, or decorative coating. The coating compositions are very particularly useful for applications in which particularly high application reliability, exterior weathering resistance, optics, scratch resistance and resistance to solvents and/or chemicals are required. Due to their low color number and high color stability, they are of particular interest for coating compositions for clear varnishes.

EXAMPLES

In the present text, percentages and ppm figures reported are, unless indicated otherwise, by weight.

The viscosities reported were measured in accordance with DIN EN ISO 3219 at 23° C. in a cone-and-plate rotary viscometer from Physica Rheolab, model MC1.

Example 1

Comparison, without Stopper, Purely Thermal Termination 588 g of hexamethylene 1,6-diisocyanate (HDI) obtained by phosgenation of 1,6-hexamethylenediamine were placed in a reaction vessel at room temperature (23° C.), maintained under nitrogen for 1 hour and subsequently heated to 40° C. 60 ppm of N,N,N-trimethyl-N-benzylammonium hydroxide were added in the form of a 3% strength solution in ethylhexanol.

The temperature rose from 40° C. to 52° C. It was subsequently heated to 60° C. After an after-reaction time of 100 minutes, the NCO value reached 40.6%.

The reaction was stopped by heating to 120° C. After filtration, the excess HDI was removed virtually completely in a thin film evaporator at an outside temperature of 170° C.

This gave a yellowish product (color number: 78 Hz, determined in accordance with DIN ISO 6271) having an NCO content of 21.7% and a viscosity of 2400 mPas.

After storage (3 months at 50° C.), the following values were measured:
Color number: 160 Hz
Viscosity: 3500 mPas Example 2 (Comparison)

The processing was carried out in a manner analogous to example 1, but the reaction was stopped by means of a molar amount of benzoyl chloride, based on the catalyst used, at 65° C. after an NCO value of 40.4% had been reached.
Color number after the reaction: 41 Hz
Viscosity: 2450 mPas
After storage (3 months at 50° C.), the following values were measured:
Color number: 85 Hz
Viscosity: 2850 mPas Example 3

According to the Invention

The processing was carried out in a manner analogous to example 1, but DABCO TMR® from Air Products was used as trimerization catalyst. After an NCO value of 40.1% had been reached, the reaction was stopped by means of a molar amount of XHC-20 (from Huntsman, X=O, $R^1$=2-hydroxyethyl, $R^2$=H in the above formula (1)), based on the catalyst used, at 65° C.

After addition of this stopper, a decrease in temperature was observed, i.e. the catalyst used was no longer active.
Color number after the reaction: 39 Hz
Viscosity: 2400 mPas
After storage (3 months at 50° C.), the following values were measured:
Color number: 51 Hz
Viscosity: 2720 mPas Example 4

According to the Invention

The experiment of example 3 was repeated using HDI obtained by reaction of 1,6-hexamethylenediamine with urea and n-butanol and thermal dissociation of the carbamates obtained.
Color number after the reaction: 42 Hz
Viscosity: 2550 mPas
After storage (3 months at 50° C.), the following values were measured:
Color number: 55 Hz
Viscosity: 2760 mPas Example 5

According to the Invention 588 g of freshly distilled HDI obtained from a phosgenation process were admixed with 12 g of ethanol and stirred at 80° C. for 2 hours. The temperature was then reduced to 65° C. 160 ppm of DABCO® TMR were then added. At an NCO value of 41.6%, an equimolar amount of XHC-20 (from Huntsman, X=O, $R^1$=2-hydroxyethyl, $R^2$=H in the above formula (I)), based on the catalyst used, was added.

The mixture was stirred for another 1 hour and the NCO value was measured again.

NCO value after the after-reaction: 41.5%.

The further processing was carried out as described under example 1.

Color number after distillation: 34 Hz
Viscosity after distillation: 1980 mPas
Color number after 3 months, 50° C.: 49 Hz
Viscosity after 3 months, 50° C.: 2050 mPas Example 6 (Comparison)

The experiment was carried out as under example 5, but the reaction was stopped using monochloroacetic acid (molar based on catalyst).

After work-up by distillation, the product gelled within 2 days.

Example 7 (Comparison)

The experiment was carried out as under example 5, but the reaction was worked up without addition of substances which interrupt the reaction.

The product crosslinked even during the work-up by distillation.

Example 8 (Comparison)

The experiment was carried out as under example 5, but the reaction was stopped using diethyl hexyl phosphate (molar, based on catalyst).

The work-up by distillation gave a light-colored product which acquired a milky turbidity after 3 days.

Color number after distillation: 49 Hz
Viscosity after distillation: 1990 mPas
Color number after 3 months, 50° C.: not measurable
Viscosity after 3 months, 50° C.: 2110 mPas

The invention claimed is:

1. A process for preparing polyisocyanates (P) by catalytic oligomerization of isocyanates (D), which comprises
   a) reacting at least one isocyanate (D) under suitable reaction conditions in the presence of at least one compound (K) which catalyzes the conversion of the isocyanate into the desired polyisocyanate and, optionally, in the presence of at least one alcohol (A) and, optionally, at least one solvent (L),
   b) adding to the reaction mixture at least one compound (S) which is able to deactivate the catalyst (K) when the desired conversion has been reached, and
   c) separating the unreacted isocyanate (D) from the resulting reaction mixture, wherein the compound (S) has the formula

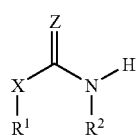

(S)

where
$R^1$ and $R^2$ are each, independently of one another, hydrogen or $C_1$-$C_{20}$-alkyl, $C_6$-$C_{12}$-aryl or $C_5$-$C_{12}$-cycloalkyl which may optionally be substituted by aryl, alkyl, aryloxy, alkyloxy, heteroatoms and/or heterocycles,
where $R^1 \neq H$ when X=O or S, and $R^1$ and $R^2$ may together with the group X—(CO)—NH also form a 5- to 12-membered ring in which $R^1$ and $R^2$ together form an optionally substituted divalent $C_2$-$C_9$-alkylene radical which can also be part of an arylene or cycloalkylene radical, Z is oxygen (O) or sulfur (S), X is oxygen (O), sulfur (S), imino (NH) or substituted imino ($NR^3$) and $R^3$ is $C_1$-$C_4$-alkyl, where in the case of the compounds (S) the at least one of the radicals $R^1$ and $R^2$ has a group which is reactive toward isocyanat, wherein the catalyst (K) is at least one catalyst selected from the group consisting of N,N,N,N-tetramethylammonium hydroxide, N,N,N,N-tetraethylammonium hydroxide, N,N,N,N-tetra-n-butylammonium hydroxide, N,N,N-trimethyl-N-(2-hydroxyethyl)ammonium hydroxide, N,N,N-trimethyl-N-(2-hydroxypropyl)ammonium hydroxide, N,N,N-trimethyl-N-benzylammonium hydroxide, N-(2-hydroxypropyl)-N,N,N-trimethylammonium 2-ethylhexanoate, N-(2-hydroxypropyl)-N,N,N-trimethylammonium 2-formate, hexamethyldisilazane, heptamethyldisilazane, hexaethyldisilazane, 1,3-diethyl-1,1,3,3-tetramethyldisilazane, 1,3-divinyl-1,1,3,3-tetramethyldisilazane and 1,3-diphenyl-1,1,3,3-tetramethyldisilazane.

2. The process according to claim 1, wherein the diisocyanate (D) is selected from the group consisting of hexamethylene 1,6-diisocyanate, 1,3-bis(isocyanatomethyl)cyclohexane, isophorone diisocyanate, 4,4'- and 2,4'-di(isocyanatocyclohexyl)methane.

3. The process according to claim 1, wherein the diisocyanate (D) has a total content of hydrolyzable chlorine of less than 200 ppm.

4. The process according to claim 1, wherein the diisocyanate (D) has a total content of hydrolyzable chlorine of up to 500 ppm.

5. The process according to claim 1, wherein the polyisocyanate (P) is selected from the group consisting of isocyanurates, biurets, urethanes and allophanates.

6. The process according to claim 1, wherein the compound (S) is selected from the group consisting of cyclic ureas (X=NH or $NR^3$)

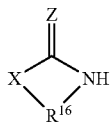

and oxazolidinones (X=O),

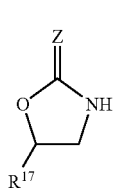

where
Z is oxygen (O) or sulfur (S),
$R^{16}$ is a $C_2$-$C_6$-alkylene radical substituted by at least one group which is reactive toward isocyanate and $R^{17}$ is a straight-chain or branched $C_1$-$C_4$-alkyl radical which is substituted by at least one group which is reactive toward isocyanate, with the proviso that the radical $R^{17}$ has a group which is reactive toward isocyanate or one of the radicals $R^3$ or $R^{16}$.

7. The process according to claim 1, wherein $R^1$ and $R^2$ in the compound (S) are selected independently from the group consisting of hydrogen and optionally substituted $C_1$-$C_4$-alkyl, as long as at least one of these radicals has at least one group which is reactive toward isocyanate.

8. The process according to claim 1, wherein the compound (S) is a compound which is obtainable by means of a reaction according to formula (III),

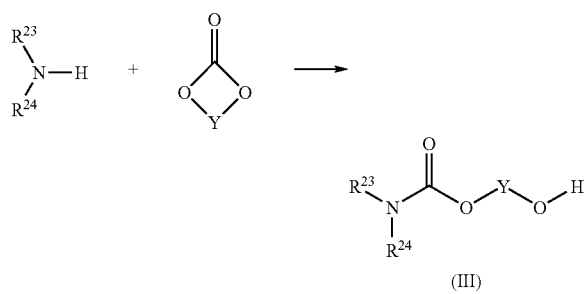

(III)

where $R^{23}$ is hydrogen, $R^{24}$ is hydrogen, $C_1$-$C_{20}$-alkyl, $C_2$-$C_{20}$-alkyl which may optionally be interrupted by one or more oxygen and/or sulfur atoms and/or one or more substituted or unsubstituted imino groups, $C_2$-$C_{18}$-alkenyl, $C_6$-$C_{12}$-aryl, $C_5$-$C_{12}$-cycloalkyl or a five- to six-membered heterocycle having oxygen, nitrogen and/or sulfur atoms, where the radicals mentioned may each be substituted by aryl, alkyl, aryloxy, alkyloxy, heteroatoms and/or heterocycles, and Y is $C_2$-$C_{20}$-alkylene, $C_5$-$C_{12}$-cycloalkylene or $C_2$-$C_{20}$-alkylene which may be interrupted by one or more oxygen and/or sulfur atoms and/or one or more substituted or unsubstituted imino groups and/or by one or more cycloalkyl, —(CO)—, —O(CO)O—, —(NH)(CO)O—, —O(CO)(NH)—, —O(CO)— or —(CO)O— groups, where the radicals mentioned may each be substituted by aryl, alkyl, aryloxy, alkyloxy, heteroatoms and/or heterocycles.

9. The process according to claim 1, wherein the compound (S) is selected from the group consisting of O-2-hydroxyethyl carbamate and O-2-hydroxypropyl carbamate.

* * * * *